(12) United States Patent
Bourqui et al.

(10) Patent No.: US 9,653,981 B2
(45) Date of Patent: May 16, 2017

(54) LINEAR ACTUATOR

(71) Applicant: Johnson Electric S.A., Murten (CH)

(72) Inventors: Yvan Bourqui, Corminboeuf (CH);
Miha Furlan, Bern (CH)

(73) Assignee: Johnson Electric S.A., Murten (CH)

( * ) Notice: Subject to any disclaimer, the term of this patent is extended or adjusted under 35 U.S.C. 154(b) by 524 days.

(21) Appl. No.: 13/868,680

(22) Filed: Apr. 23, 2013

(65) Prior Publication Data

US 2013/0278098 A1   Oct. 24, 2013

(30) Foreign Application Priority Data

Apr. 23, 2012 (CN) .......................... 2012 1 0121441

(51) Int. Cl.
| H02K 37/14 | (2006.01) |
| H02K 7/06 | (2006.01) |
| H02K 7/106 | (2006.01) |

(52) U.S. Cl.
CPC ............... H02K 37/14 (2013.01); H02K 7/06 (2013.01); H02K 7/106 (2013.01)

(58) Field of Classification Search
CPC ........... H02K 37/14; H02K 7/06; H02K 7/106
USPC ................... 310/80, 156.01, 49.19, 49.55
See application file for complete search history.

(56) References Cited

U.S. PATENT DOCUMENTS

| 3,693,034 | A | * | 9/1972 | Inariba | H02K 37/20 310/112 |
| 3,803,926 | A | * | 4/1974 | Winter | F16H 25/20 403/43 |
| 3,855,486 | A | * | 12/1974 | Binder | H02K 37/04 310/49.19 |
| 4,207,483 | A | * | 6/1980 | Baer | H02K 37/125 310/164 |
| 4,672,247 | A | * | 6/1987 | Madsen | H02K 37/20 310/181 |
| 4,884,333 | A | * | 12/1989 | Cooper | H02K 15/022 29/596 |
| 4,985,669 | A | * | 1/1991 | Smith | H02K 29/12 310/49.08 |
| 5,331,237 | A | * | 7/1994 | Ichimura | H02K 1/02 310/44 |
| 5,677,581 | A | * | 10/1997 | Yoshida | H02K 37/14 310/156.08 |
| 5,811,903 | A | * | 9/1998 | Ueno | F16C 17/08 310/40 MM |
| 5,952,758 | A | * | 9/1999 | Lucidarme | H02K 1/24 310/156.64 |
| 5,977,670 | A | * | 11/1999 | Numaya | H02K 3/525 310/49.05 |
| 6,750,588 | B1 | * | 6/2004 | Gabrys | F16C 39/063 310/113 |

(Continued)

FOREIGN PATENT DOCUMENTS

EP   0689278 A1   12/1995

*Primary Examiner* — Alex W Mok
(74) *Attorney, Agent, or Firm* — Muncy, Geissler, Olds & Lowe, P.C.

(57) ABSTRACT

A linear actuator with a high holding force providing good irreversibility, has a high efficiency, low friction screw mechanism and a stepper motor with high magnetic detent torque but a low output torque ripple. The phase torque is modified to minimize the effect of the detent torque on the output. torque. Preferably, the motor has asymmetric phases to compensate for the detent torque.

21 Claims, 5 Drawing Sheets

(56) References Cited

U.S. PATENT DOCUMENTS

| | | | | |
|---|---|---|---|---|
| 7,148,592 B2* | 12/2006 | Miyawaki | .............. | H02K 26/00 |
| | | | | 310/156.02 |
| 7,508,108 B2* | 3/2009 | Makita | ................... | H02K 21/16 |
| | | | | 310/164 |
| 7,816,822 B2* | 10/2010 | Nashiki | ................. | H02K 1/145 |
| | | | | 310/185 |
| 7,821,221 B2* | 10/2010 | Kragh | ..................... | H02P 6/085 |
| | | | | 318/774 |
| 2009/0021089 A1* | 1/2009 | Nashiki | ................. | H02K 21/24 |
| | | | | 310/46 |
| 2009/0096298 A1* | 4/2009 | Utsumi | ................. | H02K 7/003 |
| | | | | 310/49.07 |
| 2012/0091940 A1* | 4/2012 | Nashiki | ............... | H02K 19/103 |
| | | | | 318/701 |
| 2012/0267976 A1* | 10/2012 | Furrer | ................. | H02K 1/2786 |
| | | | | 310/156.51 |

* cited by examiner

LINEAR ACTUATOR

CROSS REFERENCE TO RELATED APPLICATIONS

This non-provisional patent application claims priority under 35 U.S.C. §119(a) from patent application No. 201210121441.8 filed in The People's Republic of China on Apr. 23, 2012.

FIELD OF THE INVENTION

This invention relates to an electric motor and has particular application to a linear actuator incorporating a stepper motor having improved holding torque and low vibration.

BACKGROUND OF THE INVENTION

In certain automotive applications, such as head lamp adjusters, linear actuators are used for the dynamic regulation of devices. Linear displacement is provided by a threaded connection between the rotor core of a stepper motor and the output shaft. The output shaft is prevented from rotating thus rotation of the rotor causes the output shaft to move axially. The overall behavior of the actuator is strongly governed by the effects of friction.

The stepper motor is designed for smooth operation to reduce vibration and audible noise which is generally considered as undesirable. The friction of the rotational to linear conversion, that is the screw connection between the rotor and the output shaft, thus dominates the performance of the linear actuator.

There are two opposing characteristics of linear actuators, reversibility and irreversibility. Each being desirable in different applications. Reversibility is the ability of the motor to be back driven, that is the ability to move the output shaft by applying an external force to the output shaft. This is desirable where, for example, it may be necessary to manually move the device driven by the actuator during a power failure or a motor failure. Irreversibility is the ability of the linear actuator to resist movement of the output shaft when an external force is applied to the. output shaft. This is desirable where, for example, the device being moved by the actuator is subjected to external forces in normal operation (e.g. headlamp adjustor), where the actuator is required to hold position while the electric power to the motor is removed or reduced, or where security is important (e.g. door lock mechanism). Some applications require a combination of reversibility and irreversibility (e.g. external mirror adjusters) which require a high holding force to withstand vibration and wind forces during normal operation and yet be able to be manually adjustable during power failure or motor failure. Reversibility is related to the friction of the screw mechanism. Low friction gives good reversibility and high efficiency. High friction gives good load holding ability or irreversibility but the high friction also reduces the efficiency of the linear actuator. Thus a compromise between efficiency and load holding must be made.

Friction itself is related to temperature, to the relative speed of the gear elements and to surface roughness. Temperature and speed may change regularly and surface roughness changes as a result of wear. If the thread has a good efficiency it will lead to low energy loss, and if the thread has a bad efficiency it will lead to strong irreversibility. A self-locking screw thread, the term for a screw-nut system exhibiting irreversibility, will have a low thread angle (small screw thread pitch) yielding a screw-nut transmission efficiency of typically well below 50% due to high friction, often 30% or less. Such screws will not rotate (back drive) upon application of an external axial force.

Holding force is the maximum external force which can be applied axially to the output shaft without back driving the motor. That is, for a linear actuator, the force applied to the linear output shaft which the actuator can withstand or hold without moving. As explained above, holding force in a linear actuator is generally derived from mechanical friction of the screw connection.

Friction has a strong dependency on temperature. It is possible to have reversibility and irreversibility on the same thread but at different temperatures. This means, friction should be high enough to provide a self holding force against axial displacement (auto blocking) and to avoid bouncing at stall. However, friction should be low enough to avoid cold start issues, including high grease viscosity at low temperatures and blocking at stall. Bouncing is the condition where the motor, when driven into a hard stop, such as an end of travel, the stepper motor instead of stopping continues to rotate but in the opposite direction as though it has bounced back from the stop. Blocking is the condition where the motor is driven into a hard stop and becomes jammed, unable to be moved in either direction. Bouncing and blocking problems can be a consequence of or at least promoted by low efficiency transmission systems where friction is not controlled well.

PRIOR ART

In current actuator designs, this conflicting requirement has essentially been solved with mechanical friction by properly dimensioning the gear elements and by selecting the optimum lubricant. FIG. 5 is a sectional view of a prior art linear actuator comprising a stepper motor 1 and an output shaft 2. The stepper motor has a stator 3 and a rotor 4. The rotor has a rotor shaft 5 which is at least partially threaded. The output shaft 2 is hollow and has an internal threaded portion which engages with the threaded portion of the rotor shaft to form a threaded connection 6. The rotor is able to rotate but is restricted from moving axially. The output shaft 2 is restricted from rotating but is able to move axially. As the rotor 4 turns the output shaft 2 moves axially along the rotor shaft 5 in a screw like action due to the threaded connection 6. The configuration of the threads of the threaded connection 6 between the rotor shaft and output shaft and the lubricant there between have the greatest influence on the mechanical friction of the system.

This method is critically limited for instance by temperature dependent effects like grease viscosity and material elasticities. A special lubricant that fits one particular application works only in a limited parameter range and is expensive.

European patent application EP0689278A1 discloses a stepper motor which has a high holding torque. The high holding torque is created by using a stator and rotor configuration which has a high magnetic detent torque. The detent torque may be as high as to provide the main component of the holding torque. Magnetic detent torque is by far less temperature dependent than mechanical friction. Hence, we can design an actuator by dividing it into a motor section and a gearbox section, where the holding torque is at least partially provided by the motor section. That allows the gearbox section to provide the rotary motion to linear motion conversion in an efficient, low friction arrangement. Furthermore, it minimizes the losses in the gearbox which potentially lead to heat, excessive wear and reduced output power of the actuator. It also means that the requirements on lubrication can be relaxed, allowing use of a less expensive lubricant.

However, this significant increase in detent torque produces a high torque variation (torque ripple) resulting in a marked increase in the vibration and noise of the motor when it is operating, due to the superimposed detent torque creating a large fluctuation (ripple) in the resulting dynamic torque output. FIGS. 7 and 8 illustrate the effect of detent torque on the torque ripple of a stepper motor with a high detent torque which can be compared to the torque ripple of a typical stepper motor without detent torque as shown in FIG. 6. In FIG. 7 the detent torque is aligned with the excited torque meaning that the detent torque has a maximum value when the excited torques are either at a maximum (peak) or at zero, respectively. In FIG. 8 the detent torque is shifted by 90 degrees such that the detent torque is zero when the phase excited torques are either at a maximum (peak) or at zero, respectively. Please note that the frequency of the detent torque is set to be double the frequency of the excited torques. Both graphs illustrate the adverse affect of detent torque on the excited torques, producing a combined output torque which has a large variation, known as the output ripple torque.

By simply designing the motor section with an intentionally high magnetic detent torque leads to high vibration and audible noise during operation of the motor, which is undesirable.

SUMMARY OF THE INVENTION

Hence there is a desire for an improved linear actuator incorporating a stepper motor having a high detent torque without the associated high vibration when operating.

This is achieved in the present invention by using a linear actuator which has a stepper motor with a high detent torque and a linear gearbox with a low friction screw mechanism. Therefore the actuator efficiency can be high while the holding force of the motor is constant. Vibration of the motor is controlled by modification of the normal dynamic torque to compensate for the additional detent torque so that the fluctuation in the dynamic torque output is smooth (minimized torque ripple). This is achieved by using a stator which develops asymmetric magnetic fluxes.

Accordingly, in one aspect thereof, the present invention provides an electric motor, comprising: a stator having a plurality of phase windings forming a number of magnetic poles; a rotor having a rotor core and a permanent magnet fixed to the rotor core; an output shaft, coupled to the rotor core; and a detent mechanism arranged to magnetically attract the rotor to the stator to hold the rotor in desired rotational orientation with respect to the stator with a predetermined detent torque, the detent torque producing a corresponding torque variation, wherein the phase windings are asymmetric and produce different excited torques which when combined with the detent torque produce a combined output torque having a desired torque ripple.

Preferably, the output torque has a low torque ripple.

Preferably, the desired torque ripple is less than 35% of the peak output torque.

Preferably, the predetermined detent torque is between 5% and 50% of the peak output torque.

Preferably, the predetermined detent torque is between 15% to 30% of the peak output torque.

Preferably, the detent torque is at least 10% of the excited torque.

Preferably, the number of stator phases is two and the peak excited torque produced by a first phase winding is at least 10% less than the peak excited torque of the second phase winding.

Preferably, the two phase coils have a different number of turns to produce different excited torques.

Preferably, the two stator halves corresponding to the two phases have different dimensions and/or tooth pole geometries to produce different excited torques.

Preferably, the difference between the excited torques of the two phases is in the order of 1.5 times.

Preferably, the detent torque and the excited torques are designed in amplitude and phase for optimum compensation to reduce torque ripple, wherein the detent torque has twice the frequency of the excited torque, and its minima/maxima are in phase with the minima/maxima of the excited torques.

Preferably, the motor is a stepper motor.

According to a second aspect thereof, the present invention provides a linear actuator incorporating a stepper motor as described above.

Preferably, the output shaft is restrained from rotating and is coupled to the rotor by a screw mechanism such that rotation of the rotor causes linear movement of the output shaft and the screw mechanism has a high efficiency.

Preferably, the screw mechanism has a screw-nut efficiency greater than 30%.

Preferably, the screw mechanism has a screw-nut efficiency between 40% and 60%.

According to a third aspect, the present invention provides a headlight adjustment mechanism for a vehicle incorporating a linear actuator as described above.

According to another aspect thereof, the present invention also provides a linear stepper motor, comprising: a stator having a plurality of phase windings forming a number of magnetic poles; a rotor having a rotor core and a permanent magnet fixed to the rotor core; an output shaft, coupled to the rotor core via a screw mechanism such that rotation of the rotor core produces linear movement of the output shaft; and a detent mechanism arranged to magnetically attract the rotor to the stator to hold the rotor in desired rotational orientation with respect to the stator with a predetermined detent torque, wherein the number of pole pairs of the stator is greater than ten and the screw efficiency of the screw mechanism is 50% or more.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
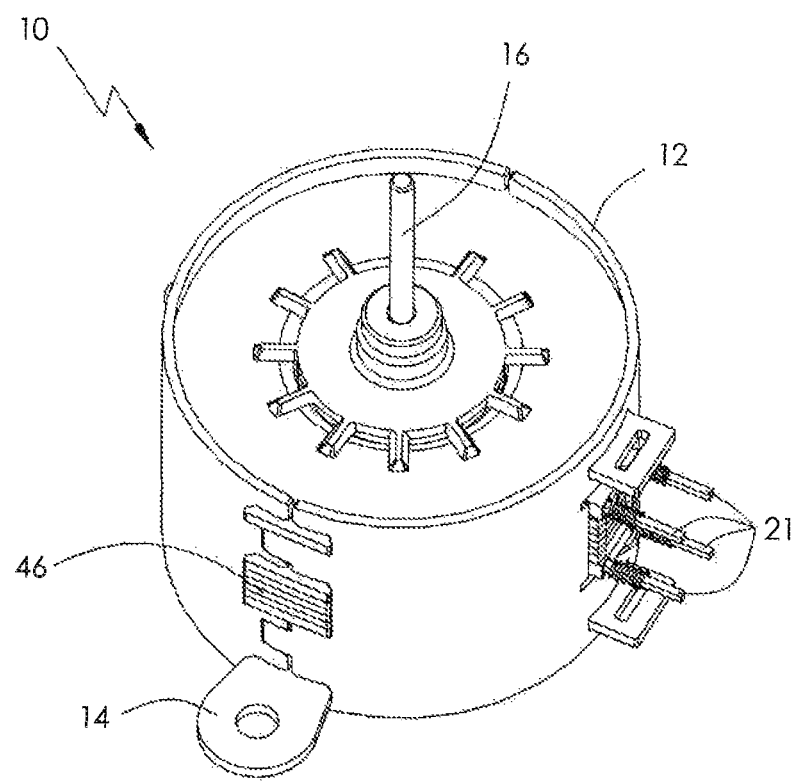
FIG. 1 illustrates a stepper motor according to a preferred embodiment of the present invention.
Figure 2:
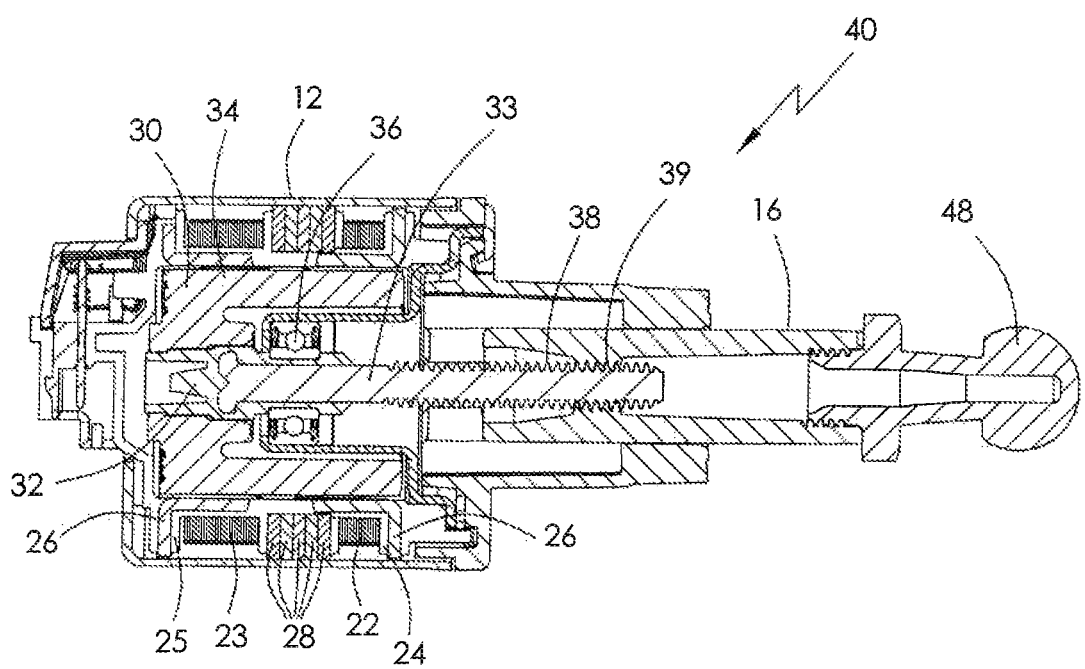
FIG. 2 is a sectional view of a linear actuator according to a preferred embodiment of the present invention.
Figure 3:
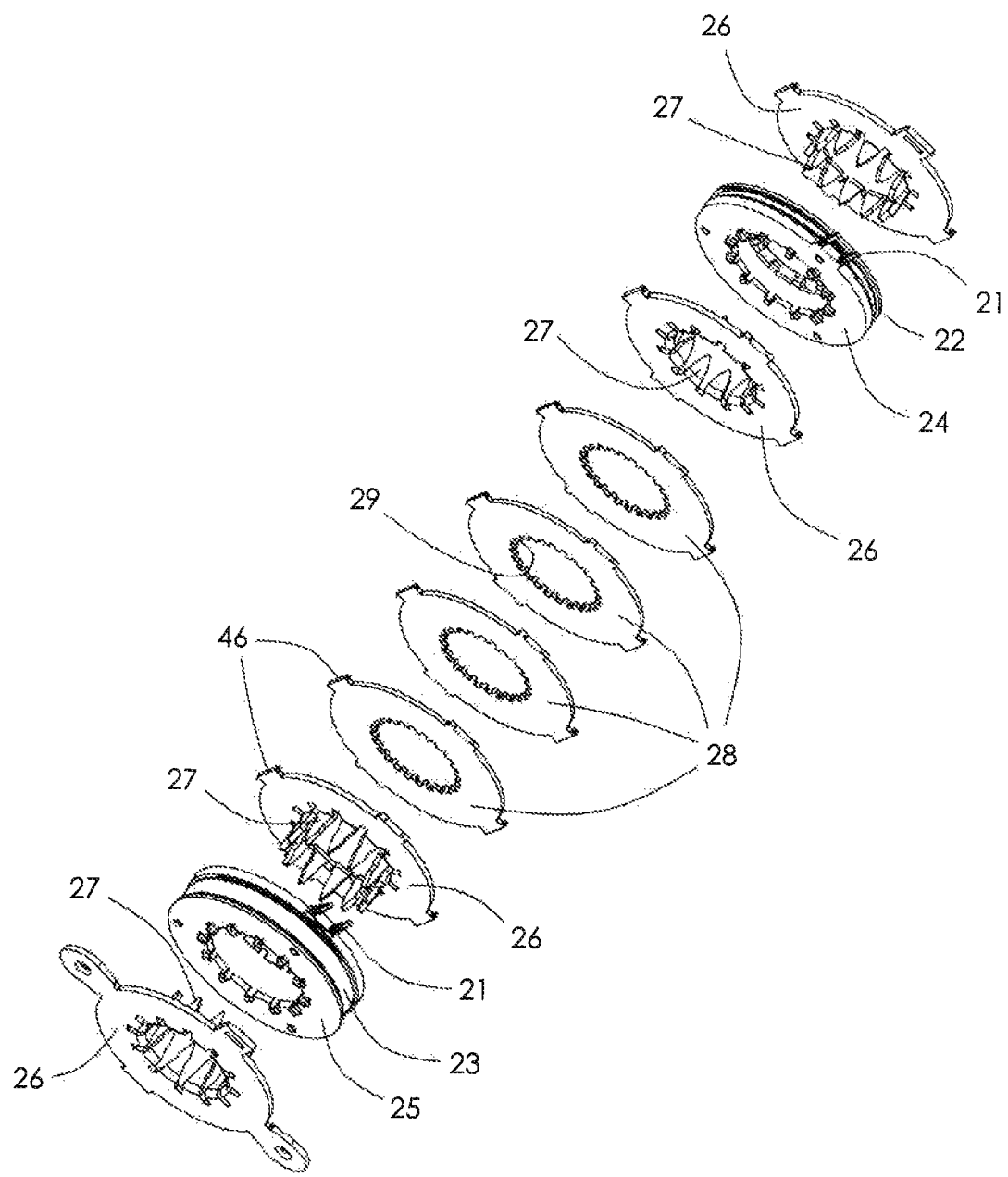
FIG. 3 is an exploded view of part of the stator of the motor of FIG. 1.

FIG. 1 illustrates a stepper motor 10 according to a preferred embodiment of the present invention. FIG. 2 is a longitudinal sectional view of a linear actuator according to a preferred embodiment of the present invention, and FIG. 3 is an exploded view of a part of the stator.

The stepper motor 10 of FIG. 1, has a housing 12 forming a part of the stator of the motor. The housing supports a number of stator plates, including a lower plate having mounting ears 14 with through holes for fixing the motor to an object. The motor has an output shaft 16 which in this case forms part of a rotor. The rotor is a permanent magnet rotor. The stator is a two phase wound stator and motor terminals 21 are seen extending from an opening in the housing. The construction of the stator will be described in detail with respect to FIG. 3.

The actuator 40 of FIG. 2 is of the linear type incorporating a stepper motor. The actuator is shown in section to illustrate the construction of one type of linear actuator. The motor has a housing 12 forming part of a stator which also includes two bobbin wound phase windings 22, 23, pole plates 26 and detent plates 28. The stator will be described in more detail with respect to FIG. 3. The motor also has a permanent magnet rotor driving an output shaft 16 of the actuator.

The rotor 30 has a rotor core 32 supporting a motor shaft 33 and a cylindrical ring magnet 34. A bearing 36 rotatable connects the rotor to the housing 12. The motor shaft 33 has a screw thread 38 which engages a screw thread 39 of the output shaft 16. The output shaft is arranged so as to be movable in the direction of the motor axis but is not able to rotate about the axis. Thus as the rotor rotates, the motor shaft 33 rotates causing the output shaft to move in the axial direction, depending on the direction of rotation of the rotor, in much the same way as a nut moves along a bolt. Attached to the end of the output shaft is a coupler 48 adapted to mate with the object to be moved by the linear actuator, in this example, a head lamp assembly of a vehicle.

FIG. 3 is an exploded view of the preferred stator pole construction. The stator comprises first and second coils 22, 23 wound on first and second bobbins 24, 25, four pole plates 26 and a number of detent plates 28. Each pole plate 26 has a number of axially extending pole fingers 27 such that in use, the pole fingers extend along side the circumferential outer surface of the rotor. Each bobbin has two terminals 21 to which respective ends of the coils are terminated. The pole plates, together with the housing form a magnetic. path for the magnetic flux generated by the coils 22, 23. Each of the detent plates has a central opening with a plurality of radially inwardly extending fingers 29.

Figure 4:
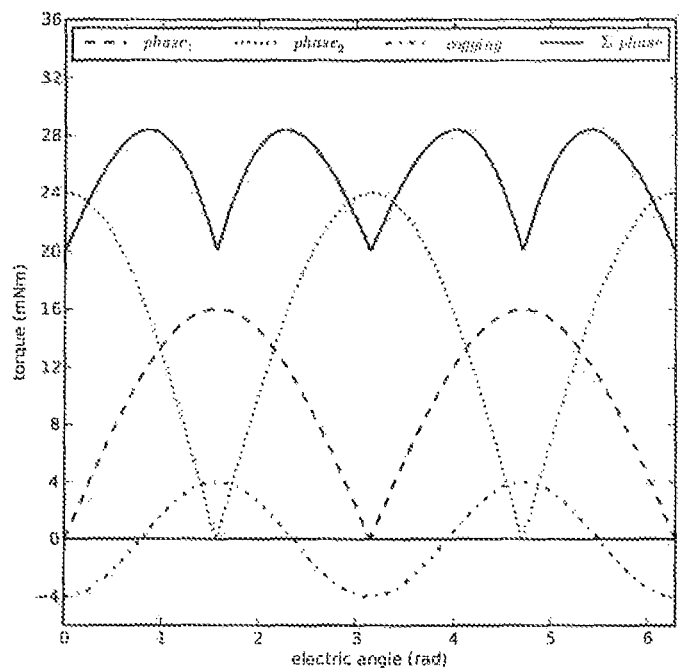
FIG. 4 is a graph of motor torque versus electrical angle for the motor of FIG. 1 having asymmetrical phases and a significant detent torque.
Figure 5:
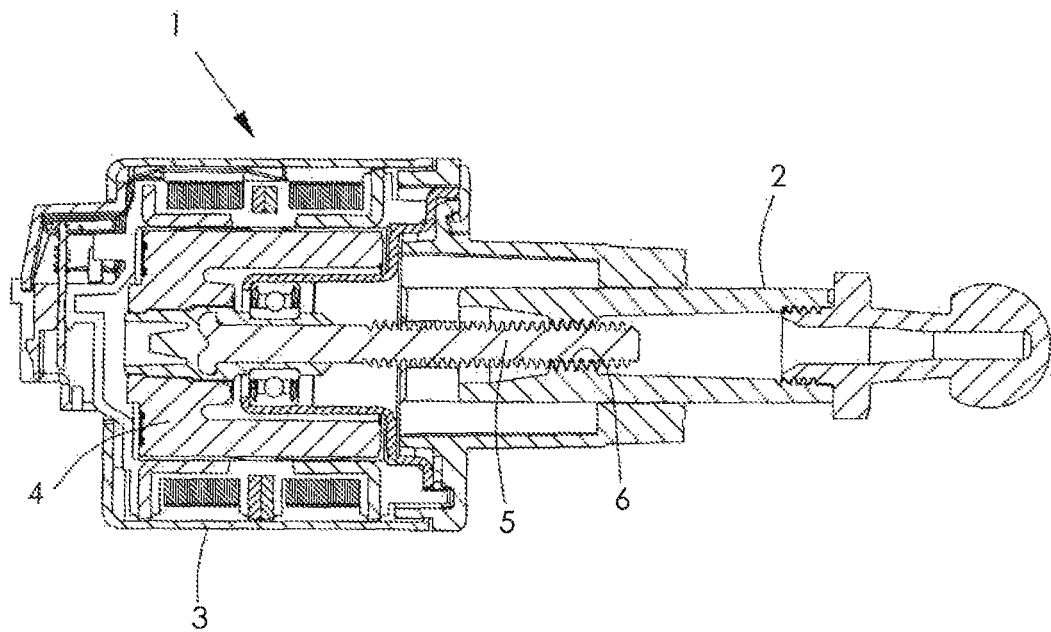
FIG. 5 is a sectional view of a prior art linear stepper motor, which relies on thread friction for holding torque.
Figure 6:
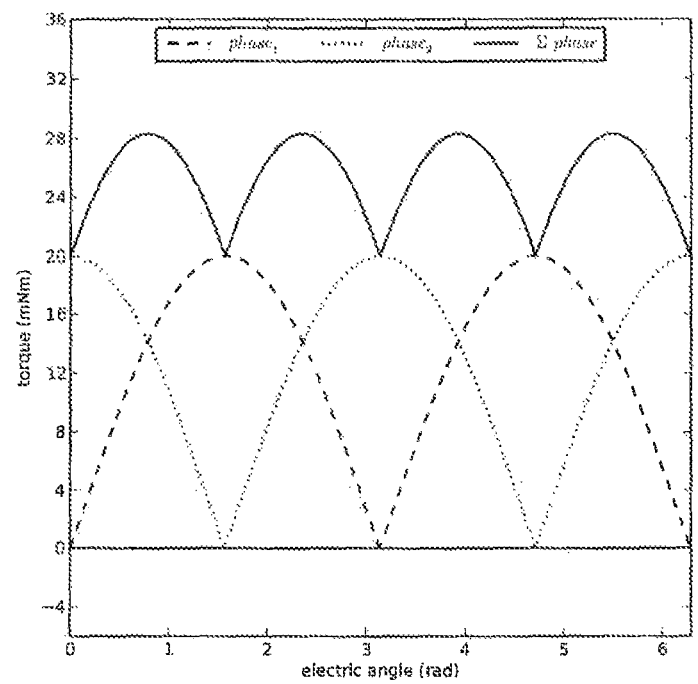
FIG. 6 is a graph of motor torque versus electrical angle for a typical prior art stepper motor with 2 symmetrical phases and without detent torque.
Figure 7:
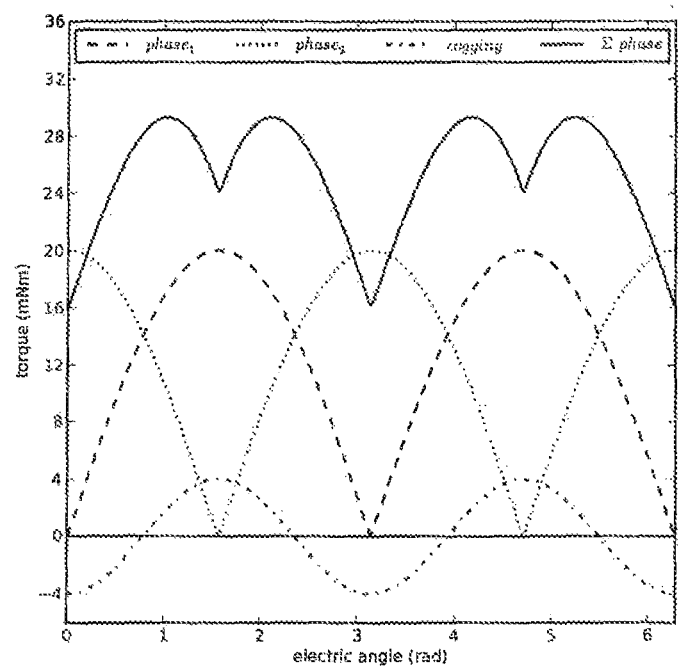
FIG. 7 is a graph of motor torque versus electrical angle for the prior art stepper motor with 2 symmetrical phases and with detent torque, in which the detent torque is in phase with the excited torques.
Figure 8:
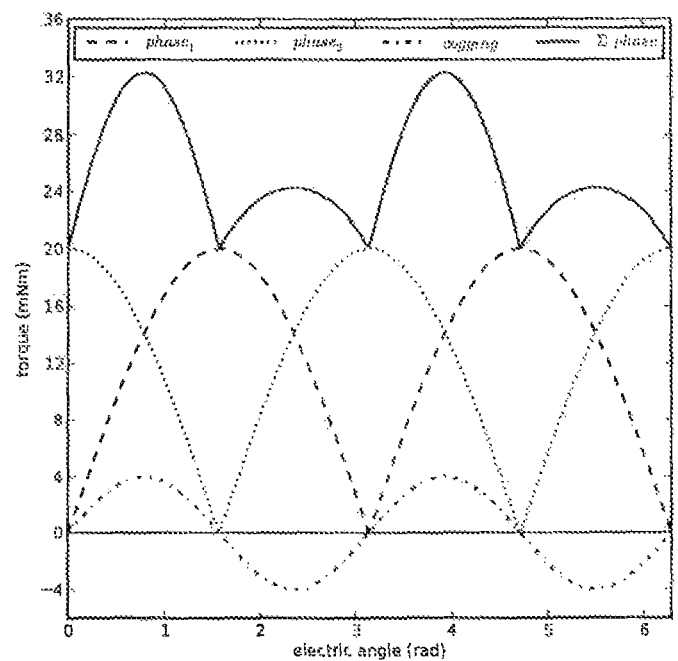
FIG. 8 is a graph of motor torque versus electrical angle for the prior art stepper motor with 2 symmetrical phases and with detent torque, in which the detent torque is 90 degrees out of phase with the excited torques.

Each of the pole plates 26 and the detent plates 28 have radially outer projections 46 which engage the housing to hold the plates in place and to complete the magnetic connection there between. The detent fingers 29 are arranged so as to attract respective magnetic poles of the rotor. Being arranged on the intermediate detent plates, the location of the detent can be more easily controlled. In the present embodiment, the locations of the detents are arranged such that the resultant detent torque is aligned with the phase torque as shown in FIG. 4. As shown, the detent torque curve is positively aligned with the first phase torque curve and negatively aligned with the second phase torque curve. Thus by reducing the size of the first phase torque and increasing the size of the second phase torque, the overall output of the motor, including the torque ripple can be made the same as or similar to a motor with no detent torque, as illustrated in the graph of FIG. 6. By no detent torque we really mean no significantly or expressly increased detent torque as all motors with permanent magnets will have some detent torque but this can be reduced to a value which has no significant impact on the performance of the motor, or at least an acceptable impact.

Asymmetric phases may be due to different magnetic fluxes which are, for example, a consequence of different tooth geometries, different air gaps or different coil windings. The asymmetric phases of the preferred embodiment are produced by different coil windings, as can be seen in FIGS. 2 & 3, in that the first coil 22 is much smaller than the second coil 23, hence the strength of the magnetic field produced by the second coil is greater than the strength of the magnetic field produced by the first coil. Preferably, the peak excited torque produced by the first phase winding is at least 10% less than the peak excited torque of the second phase winding. The current through each phase can be kept the same by appropriate selection of wire sizes to compensate for the different number of turns of the coils.

Thus, as can be seen from the above description, it is possible to create a linear actuator with a high holding force which is virtually unaffected by temperature or wear, an efficient screw connection, and with minimal noise and vibration or torque ripple. Hence an efficient. linear actuator having a screw-nut efficiency greater than 30%, even to 40% to 60% with good irreversibility is achieved with minimum noise, vibration and instability.

During operation of the motor, the sum of the detent torque and the weaker stator torque is equal to the torque produced by the stronger stator less the negative detent torque. Consequently, the sum of the excited torques plus the detent torque (FIG. 4) will approach the behavior of a motor with equal phases and without detent torque (FIG. 6).

In summary, advantages of separating the motor section from the gearbox section in a linear actuator, include the following. Friction requirements are less severe which makes thread geometry development easier. Lubricant has simpler requirements and is therefore less expensive. Holding torque is precise because it is dominated by well defined magnetic properties and less dependent on mechanical friction which is variable. For the same reason, holding torque has no long term variation and the temperature dependence of holding torque is significantly reduced. With appropriate asymmetric phases designed for optimum compensation and low ripple, complex electronic driver solutions are not needed.

For a typical head lamp adjuster application, a linear actuator requires a holding force of 50 N and a linear actuation force of 20 N. A typical prior art stepper motor would have a detent torque of about 1 mNm and an excited motor torque of 24 mNm. In the preferred embodiment, the stepper motor has a detent torque of 4 to 10 mNm yielding, together with the improved efficiency screw mechanism, the required 50 N holding force. The corresponding excited torques of the two phases are 16 and 24 mNm, respectively. Hence, the forces produced by the two phases are asymmetric by typically a factor of 1.5.

As can be seen from FIG. 4, in one form, the detent torque and the excited torque functions are designed in amplitude and phase for optimum compensation and minimum torque ripple, which is less than 35% of the peak output torque, wherein the detent torque has twice the frequency of the excited torque, and its minima/maxima are in phase with the minima/maxima of the excited torque. By high we mean a detent torque which is at least 10% of the excited torque and optionally in the range of 20% to 50% of the peak excited torque. The detent torque is also between 5% to 50% of the peak output torque, and preferred between 15% to 30% of the peak output torque. In FIG. 4, the detent torque is ±4 mNm of a total maximum torque output of 28 mNm representing a value of 14% of the 2-phase on peak torque output. It also represents a 25% value of the maximum of the weaker excited torque (phase 1) which has a peak excited torque of 16 mNm.

Figure 9:
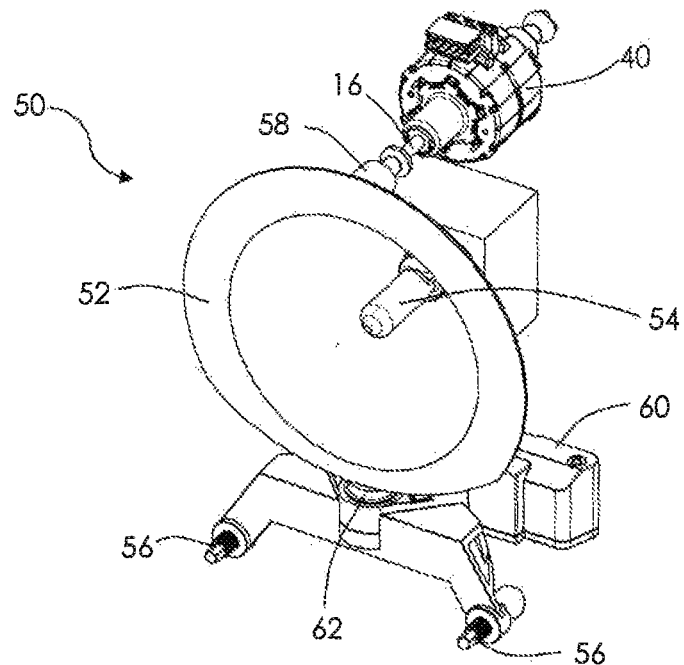
FIG. 9 is a schematic illustration of a head lamp assembly using a linear stepper motor in accordance with the present invention.

FIG. 9 illustrates a schematic representation of a head lamp assembly 50 for a vehicle such as a passenger car, which uses the linear actuator 40 of the present invention. The head lamp assembly 50 has a lamp housing 52 including a light reflector. A lamp 54 is supported by the lamp housing. The lamp housing is fixed to a frame of a support such as a car body by two adjustable mounts 56 and a variable mount 58. The mounts form three mounting points which rigidly secure the lamp housing. The two adjustable mounts 56 are turnable by a tool such as a spanner, to manually adjust the left/right aim of the light. The variable mount 58 is coupled to the output shaft 16 of the linear actuator 40. Linear movement of the output shaft causes the lamp housing to tilt resulting in the light beam from the reflector raising or falling depending on the direction of movement of the output shaft. The lamp housing is optionally held to the frame by a spring arrangement which allows the lamp housing to be firmly held against the attachment points. This arrangement allows the height of the light beam to be adjusted from the driver's seat or by computer control to compensate for various loadings of the vehicle. In advance designs, an additional actuator 60 may be used to modify the left right aim of the lamp through a swivel attachment 62 between the reflector and the two adjustable mounts 56.

According to another aspect of the invention, there is provided the possibility to produce a linear stepper motor with a high efficiency but also with a high or predeterminable holding torque. By the use of the detent plates, the detent torque can be increase to the desired level to hold the rotor against being driven by the load when not operating. The efficiency of the screw mechanism connecting the rotor to the output shaft can have an efficiency of 50% or more as the holding force is not dependent on the friction of the screw mechanism. To run the motor with a highly efficient screw mechanism the number of pole pairs of the stator can be increased significantly even double or more and ten or more pole pairs is possible.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor, comprising:
a stator having a plurality of phase windings forming a number of magnetic poles,
wherein one of the phase windings wound on a bobbin is engaged with two pole plates; a rotor having a rotor core and a permanent magnet fixed to the rotor core; an output shaft, coupled to the rotor core; and
a plurality of detent plates arranged to magnetically attract the rotor to the stator to hold the rotor in a desired rotational orientation with respect to the stator with a predetermined detent torque, the detent torque producing a corresponding torque variation, each of the plurality of detent plates comprising radially outer projections which engage a housing of the motor to hold each of the plurality of detent plates and to complete the magnetic connection therebetween;
wherein the phase windings are asymmetric and produce different excited torques which when combined with the detent torque produce a combined output torque having a desired torque ripple.

2. A motor according to claim 1, wherein the output torque has a low torque ripple.

3. A motor according to claim 1, wherein the desired torque ripple is less than 35% of the peak output torque.

4. A motor according to claim 1, wherein the predetermined detent torque is between 5% and 50% of the peak output torque.

5. A motor according to claim 1, wherein the predetermined detent torque is between 15% to 30% of the peak output torque.

6. A motor according to claim 1, wherein the detent torque is at least 10% of the excited torque.

7. A motor according to claim 1, wherein the number of stator phases is two and the peak excited torque produced by a first phase winding is at least 10% less than the peak excited torque of the second phase winding.

8. A motor according to claim 7, wherein the two phase windings have a different number of turns to produce the different excited torques.

9. A motor according to claim 7, wherein the stator has two halves, corresponding to the two phases, and having different dimensions and/or tooth pole geometries to produce different excited torques.

10. A motor according to claim 7, wherein the difference between the excited torques of the two phases is in the order of 1.5 times.

11. A motor according to claim 7, wherein the detent torque and the excited torques are designed in amplitude and phase for optimum compensation to reduce torque ripple, wherein the detent torque has twice the frequency of the excited torque, and its minima/maxima are in phase with the minima/maxima of the excited torques.

12. A motor according to claim 1, wherein the motor is a stepper motor.

13. A linear actuator incorporating a stepper motor according to claim 12.

14. A linear actuator according to claim 13, wherein the output shaft is restrained from rotating and is coupled to the rotor by a screw mechanism such that rotation of the rotor causes linear movement of the output shaft, and
wherein the screw mechanism has a high efficiency.

15. A linear actuator according to claim 14, wherein the screw mechanism has a screw-nut efficiency greater than 30%.

16. A linear actuator according to claim 14, wherein the screw mechanism has a screw-nut efficiency between 40% and 60%.

17. A headlight adjustment mechanism for a vehicle incorporating a linear actuator according to claim 13.

18. A motor according to claim 1, wherein each of the plurality of detent plates comprises having a central opening with a plurality of radially inwardly extending fingers.

19. A motor according to claim 1, wherein each pole plate comprises a plurality of axially extending pole fingers.

20. An electric motor, comprising:
a stator having a plurality of phase windings forming a number of magnetic poles, wherein one of the phase windings wound on a bobbin is engaged with two pole plates;
a rotor having a rotor core and a permanent magnet fixed to the rotor core;
an output shaft, coupled to the rotor core; and
a plurality of detent plates arranged to magnetically attract the rotor to the stator to hold the rotor in a desired rotational orientation with respect to the stator with a predetermined detent torque, the detent torque producing a corresponding torque variation, each of the plurality of detent plates comprising radially outer projections which engage a housing of the motor to hold each of the plurality of detent plates and to complete the magnetic connection therebetween.

21. An electric motor, comprising:
a stator having a plurality of phase windings forming a number of magnetic poles,
a rotor having a rotor core and a permanent magnet fixed to the rotor core;
an output shaft, coupled to the rotor core; and
a plurality of detent plates separated from the phase windings of the stator and arranged to magnetically attract the rotor to the stator to hold the rotor in desired rotational orientation with respect to the stator with a predetermined detent torque, the detent torque producing a corresponding torque variation, each of the plurality of detent plates comprising radially outer projections which engage a housing of the motor to hold each of the plurality of detent plates and to complete the magnetic connection therebetween;
the plurality of phase windings comprising a first phase winding and a second phase winding, the first phase winding engaging with a first pole plate and a second pole plate, the first pole plate disposed on a first axial side of a bobbin of the first phase winding that is facing away from the second phase winding, the second pole plate disposed on a second axial side of the bobbin of the first phase winding that is facing toward the second phase winding, the second phase winding engaging with a third pole plate and a fourth pole plate, the third pole plate disposed on a first axial side of a bobbin of the second phase winding that is facing toward the first phase winding, the fourth pole plate disposed on a second axial side of the bobbin of the second phase winding that is facing away from the first phase winding wherein the detent plates are disposed between the second pole plate and the third pole plate;
wherein the phase windings are asymmetric and produce different excited torques which when combined with the detent torque produce a combined output torque having a desired torque ripple.

* * * * *